US012190280B2

(12) United States Patent
Abrahamson et al.

(10) Patent No.: US 12,190,280 B2
(45) Date of Patent: Jan. 7, 2025

(54) METHOD AND SYSTEM FOR TRACKING INVENTORY INCLUDING INVENTORY LEVEL RECONCILIATION ACROSS INVENTORY TRACKING SYSTEM

(71) Applicant: Target Brands, Inc., Minneapolis, MN (US)

(72) Inventors: Andrew Abrahamson, Minneapolis, MN (US); Jon Dejong, Minneapolis, MN (US); Joshua Allen Reed, Minneapolis, MN (US); Joshua Wing, Minneapolis, MN (US); Matthew Michael Anderson, Minneapolis, MN (US); Michelle Lyn Fuller, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/415,372

(22) Filed: Jan. 17, 2024

(65) Prior Publication Data
US 2024/0152858 A1 May 9, 2024

Related U.S. Application Data

(62) Division of application No. 16/906,808, filed on Jun. 19, 2020, now Pat. No. 11,915,187.
(Continued)

(51) Int. Cl.
*G06Q 10/00* (2023.01)
*G06Q 10/0631* (2023.01)
(Continued)

(52) U.S. Cl.
CPC ... *G06Q 10/0833* (2013.01); *G06Q 10/06315* (2013.01); *G06Q 10/087* (2013.01); *G06Q 20/203* (2013.01)

(58) Field of Classification Search
CPC ......... G06Q 10/0833; G06Q 10/06315; G06Q 10/087; G06Q 20/203; G06Q 30/0633; G07F 9/026
(Continued)

(56) References Cited

U.S. PATENT DOCUMENTS 7,136,832 B2   11/2006   Li et al.
7,443,282 B2   10/2008   Tu et al.
(Continued)

FOREIGN PATENT DOCUMENTS

CN   108665212 A   * 10/2018   ........... G06Q 10/087
CN   108665212 B   *  3/2022   ........... G06Q 10/087
WO   2020093144 A1    5/2020

OTHER PUBLICATIONS https://web.archive.org/web/20191223133708/https://en.wikipedia.org/wiki/Database_normalization (Year: 2019).

*Primary Examiner* — Russell S Glass

(57) ABSTRACT

In general, the present disclosure describes inventory management systems and methods which track all inventory of items within a retail supply chain. A computerized system aggregates inventory movement events to produce a common source of truth for the location and disposition of items within a supply chain. Order events and inventory events are received from multiple data sources. Additionally, a current inventory level for each item at each location within the supply chain is provided according to the data source. The computerized system normalizes the information in the event messages before it is stored in the centralized inventory database. The inventory information in the database can be accessed by multiple consumers through an API to obtain the most up-to-date information about the disposition and location of an item.

18 Claims, 11 Drawing Sheets

Related U.S. Application Data

(60) Provisional application No. 62/961,867, filed on Jan. 16, 2020.

(51) Int. Cl.
*G06Q 10/0833* (2023.01)
*G06Q 10/087* (2023.01)
*G06Q 20/20* (2012.01)

(58) Field of Classification Search
USPC .......................................................... 705/28
See application file for complete search history.

(56) References Cited

U.S. PATENT DOCUMENTS

| | | | |
|---|---|---|---|
| 7,667,604 B2 | 2/2010 | Ebert et al. | |
| 8,610,179 B2 | 8/2013 | Kahlon et al. | |
| 9,336,510 B2 | 5/2016 | Dearling et al. | |
| 2005/0235274 A1 | 10/2005 | Mamou et al. | |
| 2010/0069035 A1 | 3/2010 | Johnson | |
| 2015/0220879 A1* | 8/2015 | Dearing | G06K 7/1417 235/385 |
| 2019/0258978 A1* | 8/2019 | Mahajan | G06Q 10/06315 |
| 2019/0258979 A1* | 8/2019 | Mulay | G06Q 10/06315 |
| 2019/0361917 A1 | 11/2019 | Tran et al. | |
| 2021/0035189 A1 | 2/2021 | Marietta et al. | |
| 2021/0133670 A1 | 5/2021 | Cella et al. | |
| 2021/0158275 A1* | 5/2021 | Helvie | G06Q 10/0832 |
| 2021/0158276 A1* | 5/2021 | Helvie | G06Q 30/02 |
| 2021/0374632 A1 | 12/2021 | Côté et al. | |
| 2022/0245574 A1 | 8/2022 | Cella et al. | |

\* cited by examiner

METHOD AND SYSTEM FOR TRACKING INVENTORY INCLUDING INVENTORY LEVEL RECONCILIATION ACROSS INVENTORY TRACKING SYSTEM

CROSS-REFERENCE TO RELATED APPLICATIONS

The present application is a continuation from U.S. patent application Ser. No. 16/906,808, filed on Jun. 19, 2020, which claims priority from Provisional Patent Application No. 62/961,867, filed on Jan. 16, 2020, the disclosure of which is hereby incorporated by reference in its entirety.

TECHNICAL FIELD

The present disclosure relates generally to methods and systems for tracking inventory within a supply chain. More particularly, the present disclosure describes an event-based system architecture for tracking the inventory of items at multiple locations within a retail enterprise in real time.

BACKGROUND

In retail operations, inventory management is a crucial part of the business. It is important to monitor inventory levels and movements at multiple locations within a supply chain for the retail operation. Many crucial decisions for inventory management rely on accurate accounting of inventory levels. For example, retail stores may have to balance a need to keep items in stock in order to quickly fill orders with a need to keep available stock low to reduce overhead costs. If a retail store can rely on stock of items at a nearby warehouse, it can keep less stock available at the store but still be able to fill orders relatively quickly. Real-time information about available inventory is helpful to make decisions about where inventory will be held.

SUMMARY

In summary, the present disclosure relates to methods and systems for tracking inventory within a retail supply chain. Various aspects are described in this disclosure, which include, but are not limited to, the following aspects.

In one aspect, a system for tracking inventory across a supply chain includes a centralized inventory data store and a computing system in communication with the centralized inventory data store. The computing system includes a processor and a memory communicatively coupled to the processor such that when instructions stored on the memory are executed by the processor, operate an inventory tracking engine. The inventory tracking engine operates to receive an inventory movement message regarding movement of an item from an origin location to a destination location; extract inventory information from the inventory movement message, the inventory information comprising an item identifier for the item, a quantity of the item, an origin location identifier, and a destination location identifier; receive inventory level information for the item from an origin location inventory database corresponding to the origin location identifier and from a destination location inventory database corresponding to the destination location identifier; and record updated inventory level information for the origin location and destination location in the centralized inventory data store. In some embodiments, the origin location inventory database operates within a first software system tracking inventory in a first format and the destination location inventory database operates within a second software system tracking inventory in a second format. In some embodiments, the inventory tracking system further causes the computing system to normalize the inventory level information into a single format before recording in the centralized inventory data store. In some embodiments, inventory movements include transfer orders, purchase orders, sales, and combinations thereof. In some embodiments, the system also includes an application programming interface providing access to the inventory level information in the centralized inventory data store. In some embodiments, the computing system is communicatively connected to a second computing system hosting a replenishment management system that automatically replenishes inventory on a real-time per-item basis In another aspect, a method of tracking inventory across a supply chain is provided for a supply chain include a plurality of retail locations and a plurality of distribution locations. The method comprises: receiving, at a computing system, a plurality of messages regarding inventory events, wherein an inventory event is a transfer order, a purchase order, a sale, or an inventory adjustment involving at least one item and at least one location; analyzing, with the computing system, each of the plurality of messages to determine the identity and quantity of the at least one item and the identity of the at least one location involved in the inventory event; receiving an inventory level update from an inventory database associated with the at least one location; and recording an updated inventory level for the at least one item and at least one location in a centralized inventory database. In some embodiments, the method further includes providing, through an application programming interface, the updated inventory level to a user application. The user application can be used to adjust inventory levels at one or more locations. In some embodiments, the updated inventory level is utilized by a replenishment management system operating in conjunction with an inventory management system to automatically generate purchase orders and transfers orders to adjust inventory levels at one or more locations within a supply chain, the one or more locations comprising retail stores. In some embodiments, the method further includes reconciling the plurality of messages with the inventory level update to confirm the updated inventory level.

In yet another aspect, a non-transitory computer-readable storage medium comprises computer-executable instructions which, when executed by a computing system, cause the computing system to perform a method of managing inventory levels within a retail supply chain comprising one or more distribution locations and one or more retail store locations. The method comprises: receiving, at an inventory tracking computing system, a plurality of inventory movement messages regarding real-time movements of individual items from an origin location within the retail supply chain and a destination location within the retail supply chain; extracting inventory information from the inventory movement messages, the inventory information comprising item identifiers, quantities of items, origin location identifiers, destination location identifiers, and a disposition of the items; normalizing and deduplicating the inventory information to determine updated inventory levels for the items at the origins locations and destination locations; receiving location inventory information for the items from the origin location inventory databases and destination location inventory databases; reconciling the updated inventory levels with the location inventory information; recording the reconciled updated inventory levels for the origin location and destination location and the dispositions of the items at a centralized inventory data store; communicating the reconciled updated inventory levels to a replenishment management system operating in conjunction with an inventory management system; and automatically generating, at the inventory management system, one or more purchase orders and transfers orders to adjust inventory levels at one or more distribution locations and retail store locations within the retail supply chain in response to the reconciled updated inventory levels.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
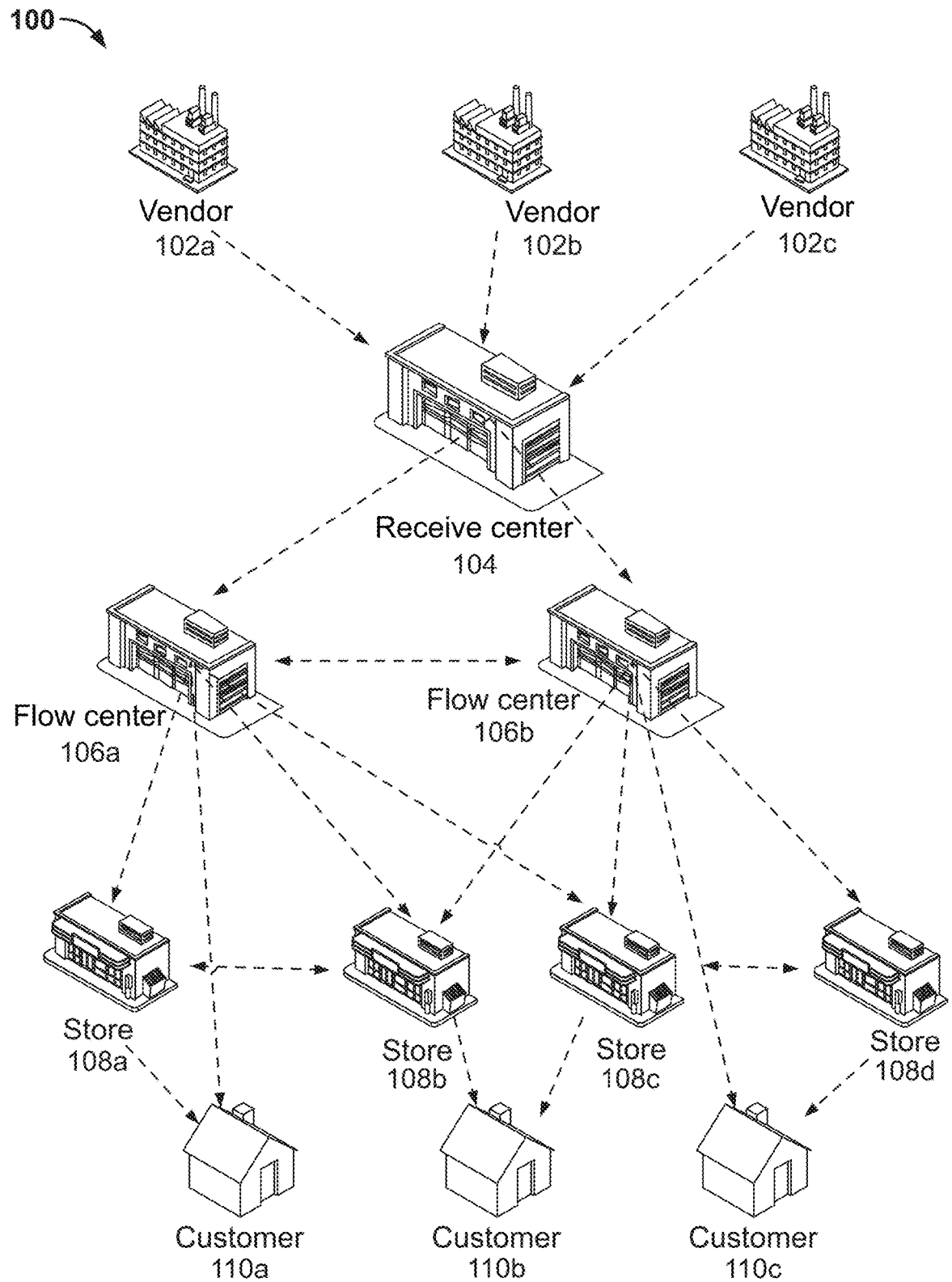
FIG. 1 illustrates a schematic diagram of an example supply chain for a retail enterprise.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes inventory management systems and methods which track all inventory of items within a retail supply chain. Inventory transactions include sales events, purchase orders, transfer orders, and other inventory movements between nodes of the supply chain. Nodes can include warehouses, distribution centers, receive centers, flow centers, stock rooms, and retail stores.

A computerized system aggregates inventory movement events to produce a common source of truth for the location and disposition of items within a supply chain. Order events and inventory events are received from multiple data sources. These data sources can include location-specific inventory management systems, such as warehouse management systems. Other data sources track movements of particular items for inventory purposes. Some of these data sources track the same items and events, thus producing event messages that are duplicative or out of order, thereby resulting in multiple data sources that track inventory levels that are out of sync with each other, resulting in discrepancies across inventory tracking and management systems.

Instead of processing these messages in batches and re-syncing occasionally to resolve duplicate messages, the inventory management system updates inventory information in real-time as event messages are received. Further, each message includes the current inventory level for each item according to the data source. Additionally, duplicate messages are blended so that the same events are not processed more than once. This avoids duplication of effort in recording item disposition and location information, and improves accuracy of inventory levels that are managed in a centralized inventory tracking system.

The computerized system also normalizes the information in the event messages before it is stored in the centralized inventory database. The various sources of data produce event messages in various formats. Information regarding the item identifier, disposition, and location for each item is extracted and normalized to a set of common disposition labels. For example, on-hand, pending available, damages, and processing are some of the labels that could be applied to an item. Time stamps are also recorded for each event. The database overwrites old status information for items with the new information as it is received so that the database serves as a single source of truth.

A validation tool operates to check the available quantity information using a callback API. The inventory levels are checked with the data source to ensure that the centralized inventory management system and its interconnected supply chain computing systems are in agreement about inventory levels across the supply chain every time an item movement takes place. A variance monitor double checks the inventory information at the centralized inventory database and at one or more data sources in order to assess whether any inventory records are inconsistent and need to be repaired. The variance monitor provides information through a variance monitoring dashboard for access by a user.

The inventory information in the database can be accessed by multiple consumers to obtain the most up-to-date information about the disposition and location of an item. Consumers can include business applications such as replenishment, business analytics, and retail stores. An application programming interface (API) enables the consumers to query the database by providing an item or location to get a report on the disposition(s) of the item(s). The centralized inventory database serves as a single source of truth for the real-time location and disposition of each item within a retail supply chain.

The methods and systems described herein are useable in conjunction with an event-driven architecture for real-time replenishment of inventory, tracked on a per-item basis. Demand forecasting is utilized to anticipate customer demand at each location for each item. The event-driven architecture allows for both a reduction in the amount of inventory that is stored at any time, both throughout an enterprise and at retail locations in particular, while also being able to reliably respond more quickly to customer demand. When used in that context, and in a manner unified with the supply chain management system, the inventory management systems described herein provide a near-real-time, accurate view of inventory positioning without requiring querying of various locations within the supply chain, thereby improving accuracy and efficiency in providing supply chain levels for reporting and planning purposes.

Additionally, in example embodiments, user interfaces may be provided that show to a management user an at-a-glance view of inventory variance, to determine an extent to which overall inventory levels that are tracked diverge from local inventory tracking levels. This allows for not only improved synchronization between enterprise-level inventory tracking systems and local inventory monitoring systems, but also allows for root-cause detection of variance by allowing for display of variance between different types of inventory measurements.

FIG. 1 illustrates a schematic diagram 100 of an example supply chain for a retail enterprise. The diagram 100 illustrates the flow of inventory from vendor 102 to customer 110. The inventory moves through various nodes within the supply chain to arrive at the customer. In this example, the nodes include a receive center 104, two flow centers 106a, 106b, and four retail stores 108a, 108b, 108c, 108d. The vendors 102 and customers 110 are considered to be locations outside of the supply chain, but can be origins or destinations for item movements.

In practice, the supply chain could include many more nodes in different proportions. In some embodiments, there are not separate receive centers and flow centers. Instead, there may be one type of warehouse or distribution center for holding inventory before distributing to stores and customers. Arrows in the diagram indicate movement of inventory. Inventory will typically flow downward through the supply chain, but in some instances inventory may move between flow centers 106 or between retail stores 108. In some embodiments, inventory may even move from a flow center 106 to a receive center 104 or from a retail store 108 to a flow center 106.

Vendors 102 produce the items or products that will be sold by the retail entity. A purchase order is typically placed to request products from a vendor. In some instances, products are shipped from the vendor 102 to a receive center 104. Once at the receive center 104, the products are prepared for transportation to one or more flow centers 106.

A variety of products are prepared for shipment to one or more flow centers 106. The flow centers 106 are typically positioned to enable quick shipment to one or more retail stores 108. Each flow center 106 may supply inventory to multiple retail stores 108. In some instances, more than one flow center 106 will send inventory to a retail store 108. For example, in FIG. 1, flow center 106a distributes inventory to stores 108a, 108b, and 108c. In some instances, products are shipped directly from flow centers 106 to customers 110. Items can also be shipped between flow centers 106 to position inventory where it is most needed.

Once products arrive at the retail stores 108, they are available for in-store purchases, pick-up orders, or local delivery. Depending on the location of a customer ordering products online, the shipments of products could come from one or more retail stores 108. For instance, customer 110b could receive shipments of products from either store 108b or store 108c. Items can also be shipped between retail stores 108 to better position the items to be available to meet customer demand.

In the context of the present disclosure, a supply chain management system is provided that assists in coordination of product shipments among nodes of the supply chain, and uses inventory models to automatically rebalance inventory within the supply chain of the enterprise to ensure predicted and actual item demand from customers of the enterprise is fulfilled to a predetermined threshold success rate. The supply chain management system allows for balancing of items across the supply chain based on inventory and demand models, as well as real time demand signals, and performs automated generation of purchase and transfer orders throughout the supply chain based on such demand and lead time calculations between points both within and external to the supply chain.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders.

Figure 2:
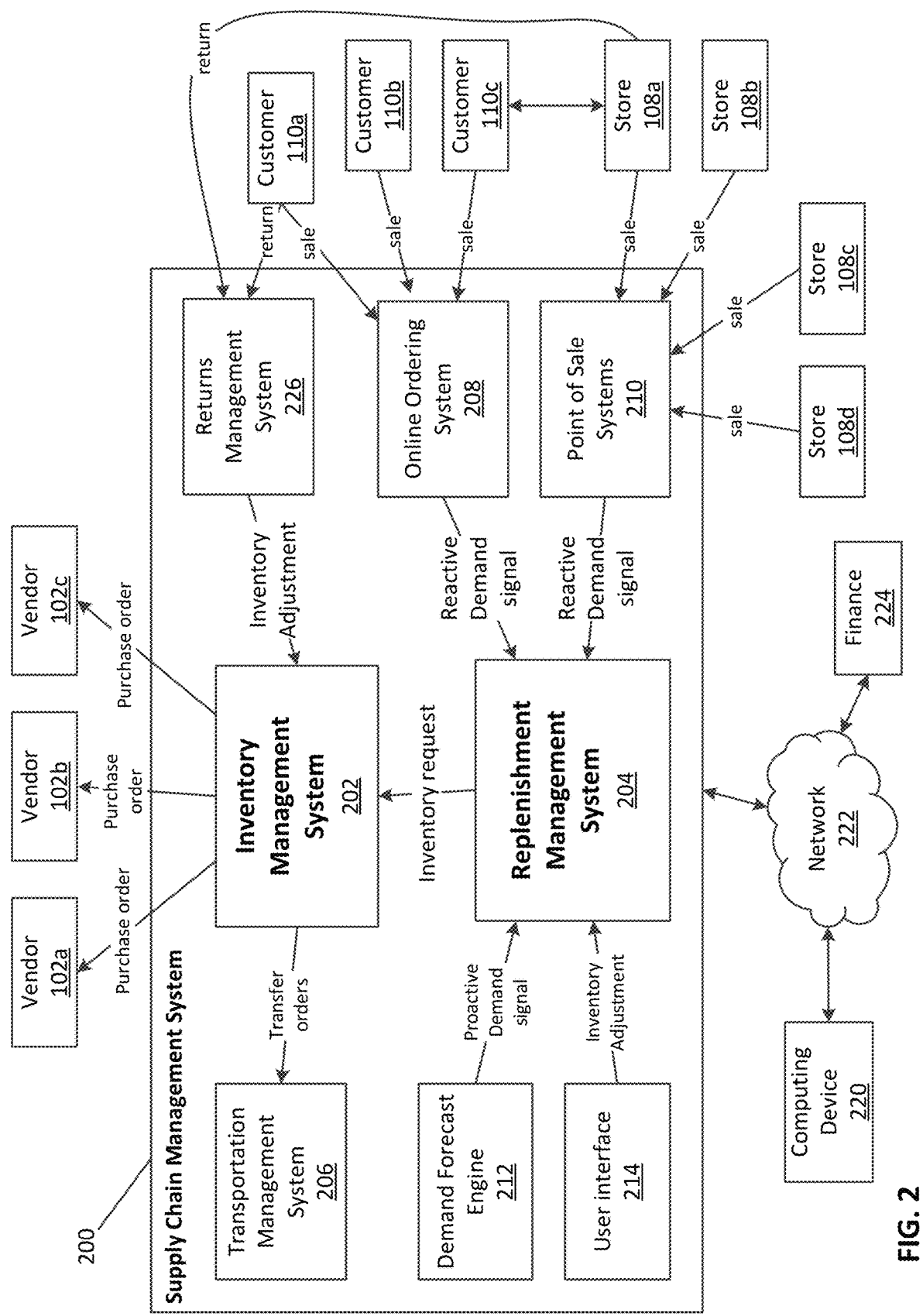
FIG. 2 illustrates a schematic diagram of an example supply chain management system.

The supply chain management system relies upon up to date inventory information that is provided by the inventory management system 202 described in FIG. 2. Real-time or near-real-time inventory information allows for various supply chain systems to make determinations about positions of inventory within the supply chain using the most accurate, and up to date information possible.

FIG. 2 illustrates a schematic diagram of an example system 200 for managing a supply chain. The key components of the supply chain management system 200 are an inventory management system 202 and a replenishment management system 204. Together, the inventory management system 202 and replenishment management system 204 operate to monitor inventory levels across all nodes of a supply chain, determine if and when adjustments to inventory levels need to be made, and facilitate transport of inventory between nodes to respond to customer demand. An example supply chain management system is further described in copending U.S. patent application Ser. No. 15/898,837, filed Feb. 19, 2018, the disclosure of which is hereby incorporated by reference in its entirety.

The inventory management system 202 receives inventory requests from the replenishment management system 204. In response to the inventory requests, the inventory management system 202 determines whether additional inventory is needed at one or more nodes within the supply chain to satisfy the request. Additional inventory may be transported to one node from another node if sufficient stock of the needed product(s) is available within the required timeframe within the supply chain. In such instances, transfer orders are issued to the transportation management system 206. If the inventory management system 202 determines that there is not sufficient stock of the requested products at another node or that transporting the products within the supply chain would be too costly or time consuming, additional stock is ordered from one or more vendors 102 through purchase orders issued from the inventory management system 202. The inventory management system 202 is further described with respect to FIG. 3.

The replenishment management system 204 receives demand signals from an online ordering system 208, one or more point of sale systems 210, and a demand forecast engine 212. The demand signals can be proactive or reactive. Proactive demand signals come from the demand forecast engine 212 and are generated by predicting expected customer demand for individual products on a day by day basis. Reactive demand signals come from sales made at the point of sale system 210 or through the online ordering system 208. The online ordering system 208 receives orders from customers 110 and coordinates fulfillment of those orders. The point of sale systems 210 record sales that are made at stores 108. The replenishment management system 204 also receives inventory adjustments from the user interface 214. Inventory adjustments are instructions received from a user to modify inventory levels at one or more locations or nodes within the supply chain. Inventory adjustments may be made for reasons other than expected or actual customer demand for particular items. The replenishment management system 204 is further described with respect to FIG. 3.

In some embodiments, the supply chain management system 200 communicates with a computing device 220 through a network 222. The network 222 can be any of a variety of types of public or private communications networks, such as the Internet. The computing device 220 can be any network-connected device including desktop computers, laptop computers, tablet computing devices, smartphones, and other devices capable of connecting to the Internet through wireless or wired connections. In some instances, the supply chain management system 200 also communicates with a finance system 224 through the network 222.

Figure 3:
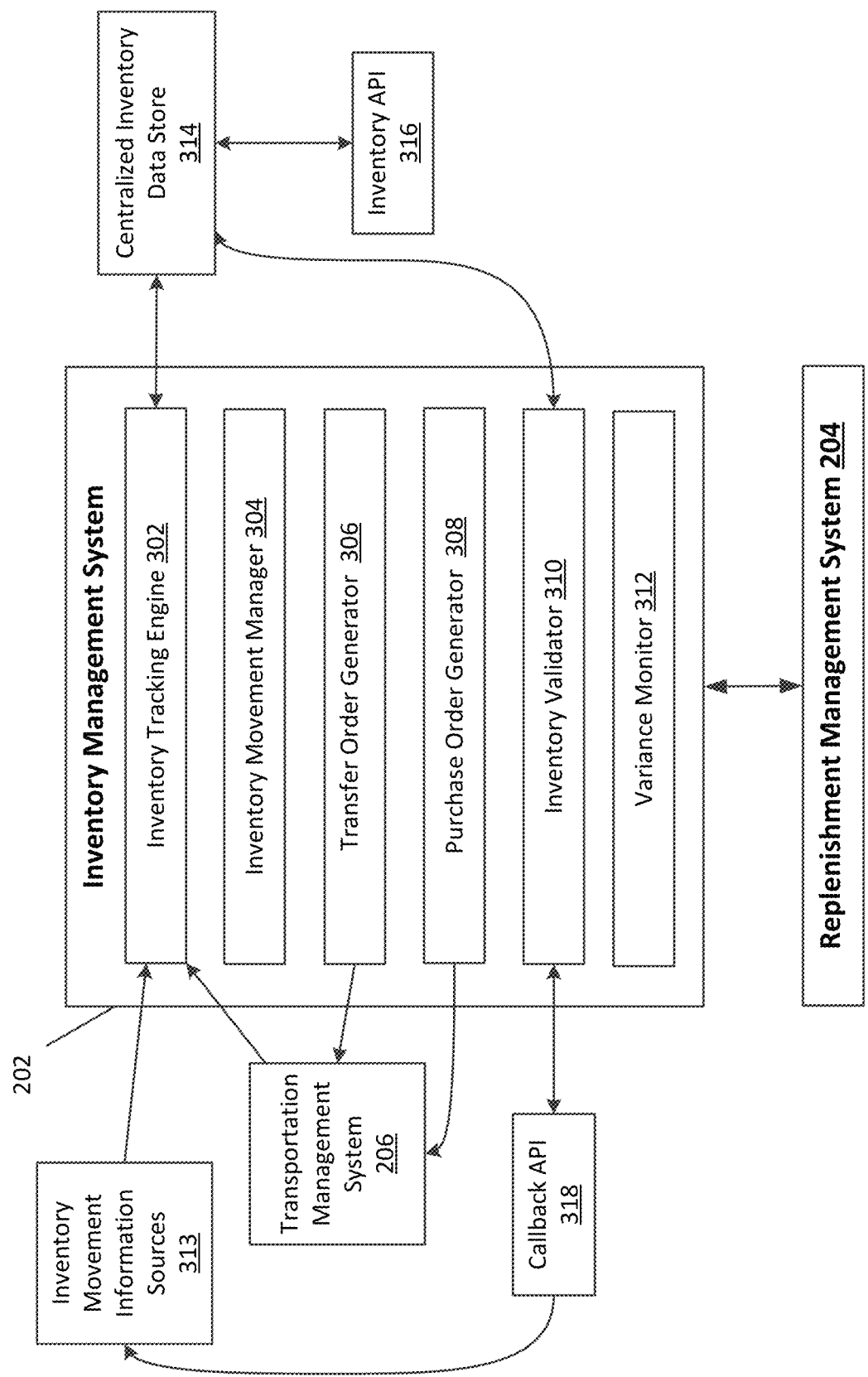
FIG. 3 illustrates a more detailed view of the inventory management system of FIG. 2.

FIG. 3 shows a more detailed schematic of the inventory management system 202 and replenishment management system 204. The inventory management system 202 includes an inventory tracking engine 302, inventory movement analyzer 303, a transfer order generator 306, a purchase order generator 308, an inventory validator 310, and a variance monitor 312. The inventory management system 202 is stored as machine readable instructions on a memory device. When executed by a processing device, the inventory management system 202 operates to perform at least some of the functions described in FIG. 5

The inventory management system 202 receives inventory requests from the replenishment management system 204. The replenishment management system 204 can include a proactive replenishment system and a reactive replenishment engine (not shown). The proactive replenishment engine receives inventory adjustment signals from the demand forecast engine 212 and the user interface 214. The reactive replenishment engine receives demand signals in the form of sales from the online ordering system 208 and the point of sale system 210.

In response to the inventory requests, the inventory management system 202 determines whether additional inventory is needed at one or more nodes within the supply chain to satisfy the request. The inventory tracking engine 302 determines the current inventory levels of each node and tracks movements of inventory throughout the supply chain. The inventory tracking engine 302 receives updates on every movement of inventory within the supply chain from other computing systems such as the transportation management system 206 and the inventory movement information sources 313. Example inventory movement information sources 313 are described in greater detail with respect to FIG. 6. The inventory tracking engine 302 updates the inventory data store 314 as inventory levels change in real-time. The inventory movement manager 304 utilizes the information in the centralized inventory data store 314 to determine if any inventory needs to be moved within the supply chain as the inventory levels change at each node of the supply chain.

Additional inventory may be transported to one node from another node if sufficient stock of the needed product(s) is available within the required timeframe within the supply chain. In such instances, transfer orders are issued to the transportation management system 206 by the transfer order generator 306. If the inventory management system 202 determines that there is not sufficient stock of the requested products at another node or that transporting the products within the supply chain would be too costly or time consuming, additional stock is ordered from one or more vendors 102 through purchase orders issued from the purchase order generator 308.

The inventory movement manager 304 receives status updates from the inventory tracking engine 302 and analyzes the changing inventory levels at each node within the supply chain to determine if any inventory movements are needed. The inventory movement manager 304 receives inventory requests from the replenishment management system 204. Based on these inventory requests, the inventory movement manager 304 determines whether the inventory levels are at their preferred levels. The preferred levels are determined on a per-item basis for each day. The inventory goals could change from day to day for each item and node location. The inventory movement manager 304 evaluates the current inventory levels at each node and compares them to that day's goal and the following day's goal to determine if inventory movements need to be changed to redistribute inventory.

The inventory movement manager 304 determines how items should be moved between nodes of the supply chain, based on the inventory goals. If inventory is available within the supply chain to satisfy an inventory request and the costs are not too high to move the inventory, the inventory movement manager 304 will send a signal to the transfer order generator 306. If the inventory movement manager 304 determines that there is insufficient supply of an item within the supply chain to satisfy an inventory request or that the cost of moving items outweighs the cost of ordering new stock, the inventory movement manager 304 sends a signal to the purchase order generator 308.

The transfer order generator 306 communicates with the transportation management system 206 to transfer stock of products from one node to another. Transfer orders are generated when the inventory management system 202 has received an inventory request and the inventory movement manager 304 has determined that the additional inventory can be moved from another node. In some embodiments, transfer orders are communicated through a streaming data messaging queue system such as Apache Kafka®. The messages can include information identifying the items being moved, the origin and destination of an item movement, a quantity of items being moved, and a disposition of the item.

The purchase order generator 308 sends orders to vendors for additional stock of products. Purchase orders are communicated to the transportation management system 206 in order for transportation of the products from the vendor to a receive center to be arranged. A computing system managing purchase orders can also serve as a source of information for the inventory tracking engine 302.

The inventory validator 310 operates to check available quantity information using the callback API 318. Inventory levels stored in the centralized inventory data store 314 are checked against inventory movement information sources 313 every time an item movement takes place within the supply chain. This that all systems are in agreement about inventory levels across the supply chain.

The variance monitor 312 operates to periodically check inventory levels as recorded by inventory movement information sources 313 and the centralized inventory data store 314. The variance is provided as a percentage representing how many items have inventory level values that differ between an inventory movement information source and the centralized inventory data store 314. Checks may be scheduled at different intervals for different items. When an item is discovered that has inventory values differing between inventory movement information sources 313 and the centralized inventory data store 314, a repair event is triggered to proactive correctly the inventory information. The variance monitor 312 is described in further detail with respect to FIG. 8.

The inventory tracking engine 302 communicates with a centralized inventory data store 314. In some embodiments, more than one inventory data store are in communication with the inventory tracking engine 302. The inventory tracking engine 302 is further described in relation to the method 500 of FIG. 5.

The inventory API 316 allows a front-end user interface to query the inventory data store 314 to receive information regarding inventory levels at one, some, or all locations across the enterprise supply chain. Accordingly, via the inventory API 316, a user application can view near-realtime current inventory levels at a per-item level. Furthermore, because the inventory data store 314 is maintained up to date in a near-realtime basis, aggregation of inventory information from store-level inventory systems is not required to provide updated inventory levels to a requesting user or application. The inventory API 316 can also be used by other computing systems to access information in the centralized inventory data store 314, e.g., to allow other systems managed within the enterprise to see real-time inventory levels across the enterprise and/or integrate such inventory levels with other types of systems (e.g., purchasing or delivery systems) to provide improved order fulfillment or vender management operations.

In some embodiments, the centralized inventory data store 314 operates to store only the most up to date inventory information. Data is continually overwritten as updates are received. In some embodiments, the centralized inventory data store 314 uses a NoSQL database such as Apache Cassandra® or Amazon DynamoDB. In some embodiments, the centralized inventory data store 314 is hosted on a cloud network such as Amazon's AWS Cloud or Microsoft Azure.

Figure 4:
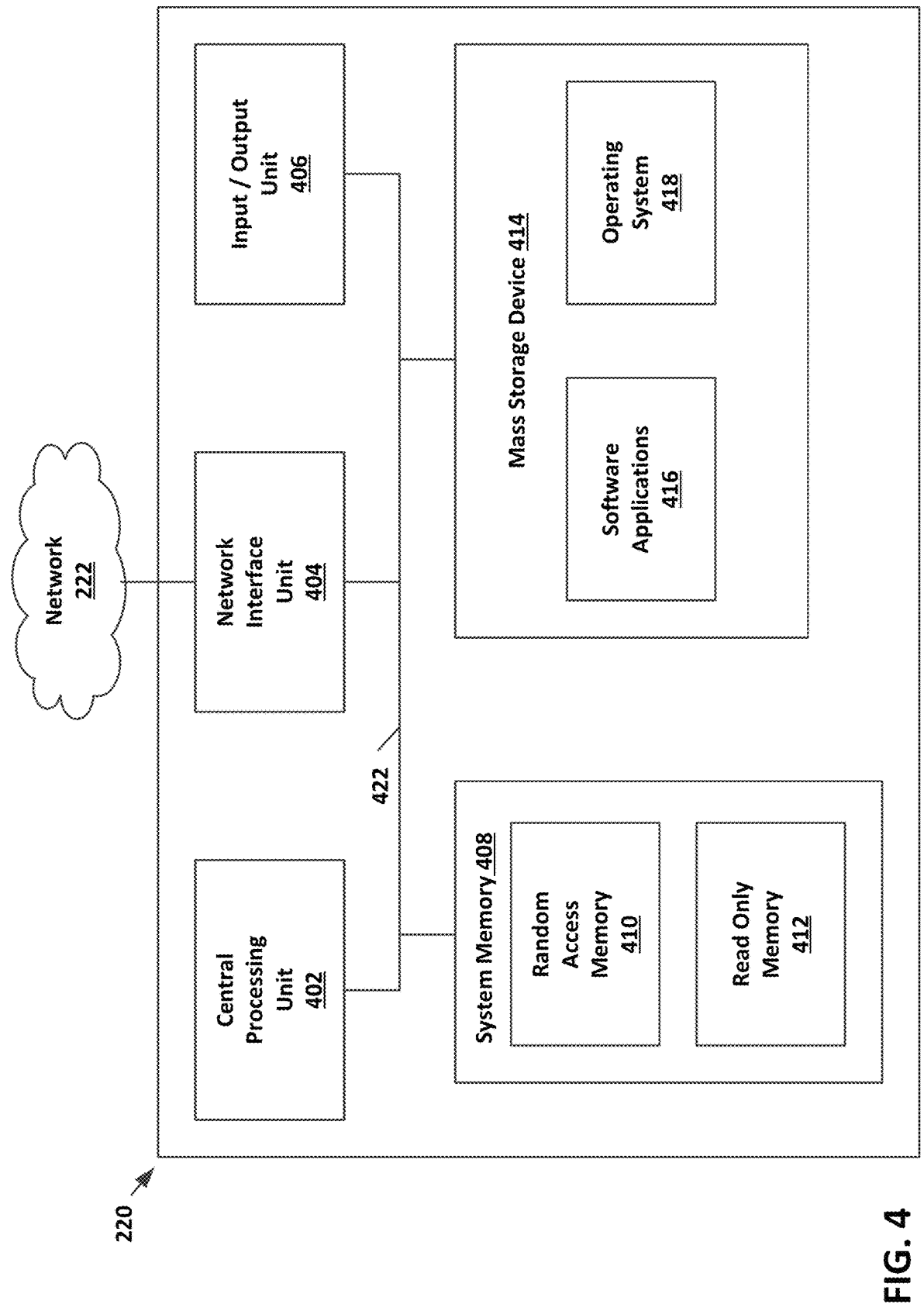
FIG. 4 illustrates an example block diagram of a computing system usable in the supply chain management system of FIG. 2.

Referring now to FIG. 4, an example block diagram of a computing system 220 is shown that is useable to implement aspects of the supply chain management system 200 of FIG. 2. In the embodiment shown, the computing system 220 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing system 220, such as during startup, is stored in the ROM 412. The computing system 20420 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing system 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 220.

According to various embodiments of the invention, the computing system 220 may operate in a networked environment using logical connections to remote network devices through a network 222, such as a wireless network, the Internet, or another type of network. The computing system 220 may connect to the network 222 through a network interface unit 404 connected to the system bus 422. It should be appreciated that the network interface unit 404 may also be utilized to connect to other types of networks and remote computing systems. The computing system 220 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing system 220 can store software instructions and data. The software instructions include an operating system 418 suitable for controlling the operation of the computing system 220. The mass storage device 414 and/or the RAM 410 also store software instructions, that when executed by the CPU 402, cause the computing system 220 to provide the functionality discussed in this document. For example, the mass storage device 414 and/or the RAM 410 can store software instructions that, when executed by the CPU 402, cause the computing system 220 to receive and analyze inventory and demand data.

Figure 5:
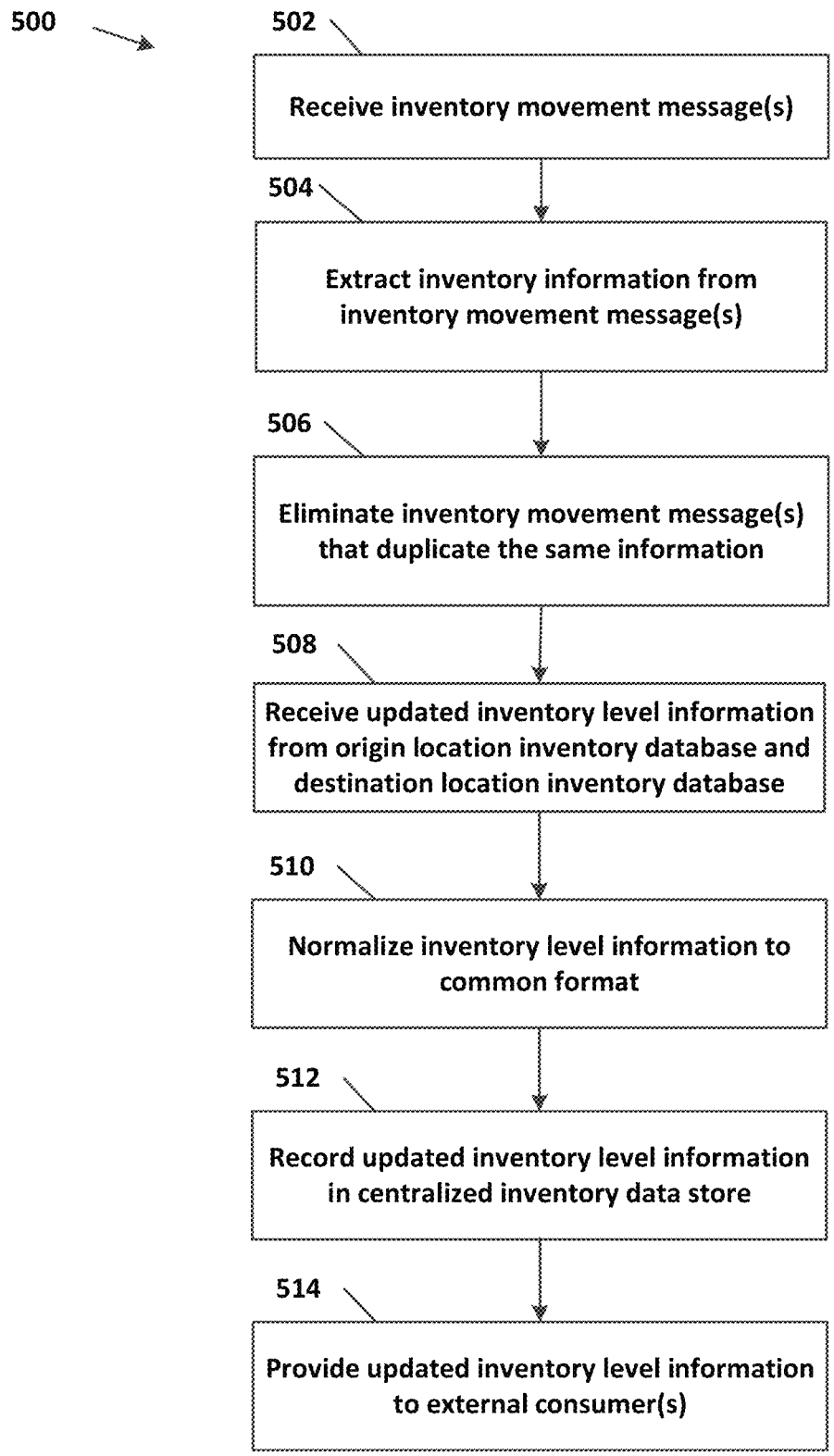
FIG. 5 illustrates a flow diagram of a method of tracking inventory within a retail supply chain.

FIG. 5 displays a flow diagram of a method 500 of tracking inventory within a retail supply chain. The supply chain includes a plurality of retail locations and a plurality of distribution locations. The supply chain may be structured like the example supply chain depicted in FIG. 1. In some embodiments, the method 500 is performed by an inventory tracking engine 302 such as the one depicted in FIG. 3.

At operation 502, inventory movement messages at received. In some embodiments, this is performed by a computing system such as the inventory management system 202. In some embodiments, one message at a time is received and processed by the inventory management system 202. In other embodiments, two or more inventory movement messages might be received by the inventory management system 202 at one time. The messages relate to movement of inventory to and from nodes within a supply chain. In some embodiments, the messages are received from various sources such as the information producers 602 discussed in FIG. 6. Movement of information is facilitated by a messaging system such as Apache Kafka®. In some embodiments, the messages relate to purchase orders, transfer orders, legacy orders, and/or customer orders.

At operation 504, inventory information is extracted from the inventory movement message(s) by the inventory management system 202. Inventory information can include item identifiers such as stock-keeping unit (SKU) numbers or universal product code (UPC) codes. One or more items can be identified from a single inventory movement message. The quantity of each item is also included in the inventory information. Quantities can be provided in terms of individual units or larger groupings of items such as pallets or containers. For each movement, identifiers for an origin and a destination are provided. In some instances, the origin or destination might be outside of the supply chain such as a vendor or a customer. In other instances, both the origin location and destination location are nodes within a supply chain such as two different warehouses or a warehouse and a retail store. Finally, the extracted information can include a disposition of the item. Some examples of dispositions include on-hand, pending available, damaged, reserved, and processing.

At operation 506, duplicate messages are eliminated. In some instances, more than one computing system might record an item movement between two nodes and two different messages will be received regarding the same item movement. The messages are analyzed to deduplicate the item movement information. In some embodiments, this is performed by, for example, the inventory validator 310 and/or inventory tracking engine 302 of the inventory management system 202 of FIG. 3.

At operation 508, updated inventory level information is received from the origin location and destination location, e.g., by inventory tracking engine 312. In some embodiments, a local database at each location is queried to determine the current levels of inventory for the item(s) involved in the message(s) being analyzed by the inventory management system 202. The current inventory levels for the relevant items are used to confirm that the inventory levels being recorded by the inventory tracking engine 302 are correct. In the event that there were duplicate messages, the inventory level information received for the origin location and destination location is used as a double check to ensure that the correct messages were processed. In some embodiments, the systems providing messages also provide current inventory levels. In other embodiments the current inventory levels are determined by separate systems.

At operation 510, the inventory level information for the origin and destination locations are normalized to a single, common format. The inventory level information and other information received in the inventory movement messages could be received from multiple different software systems using multiple different formats, since various different location-based inventory tracking systems may utilize different data formats. Normalization of the information to a common format, for example by the inventory tracking engine 302, sets up the information for storage.

At operation 512, updated inventory level information is recorded in the centralized inventory data store 314. The updated inventory level information from the origin location and destination location is reconciled inventory information extracted from the inventory movement messages. The item counts for each item and each location involved in the inventory movement are updated in the centralized inventory data store 314.

At operation 514, updated inventory level information is provided to one or more external consumers through an API. In some embodiments, the inventory API 316 allows systems such as pricing, order allocation, retail stores, demand analysis, online sales, and replenishment to access current inventory information. In some embodiments, retail stores access the inventory API 316 to gather current information about the location and disposition of particular items within the supply chain in order to plan which items to stock in the store and how many units of those items to keep on hand. The retail stores can keep stock for both in-store purchases and fulfillment of online orders.

In some embodiments, the updated inventory level information is utilized by the replenishment management system 204 operating in conjunction with the inventory management system 202 to automatically generate purchase orders and transfers orders to adjust inventory levels at one or more locations within a supply chain. In some embodiments, the inventory movement messages analyzed by the inventory tracking engine 302 are done so in real-time on an per-item basis to update the centralized inventory data store 314 with near-realtime inventory level information for the supply chain. This near-realtime inventory level information is utilized by the replenishment management system 204 then issue additional inventory movement messages to replenish inventory on a real-time per-item basis so that inventory is positioned such that retail stores have enough stock on hand to fulfill orders and satisfy in-store demand but not so much that storage space is wasted.

Figure 6:
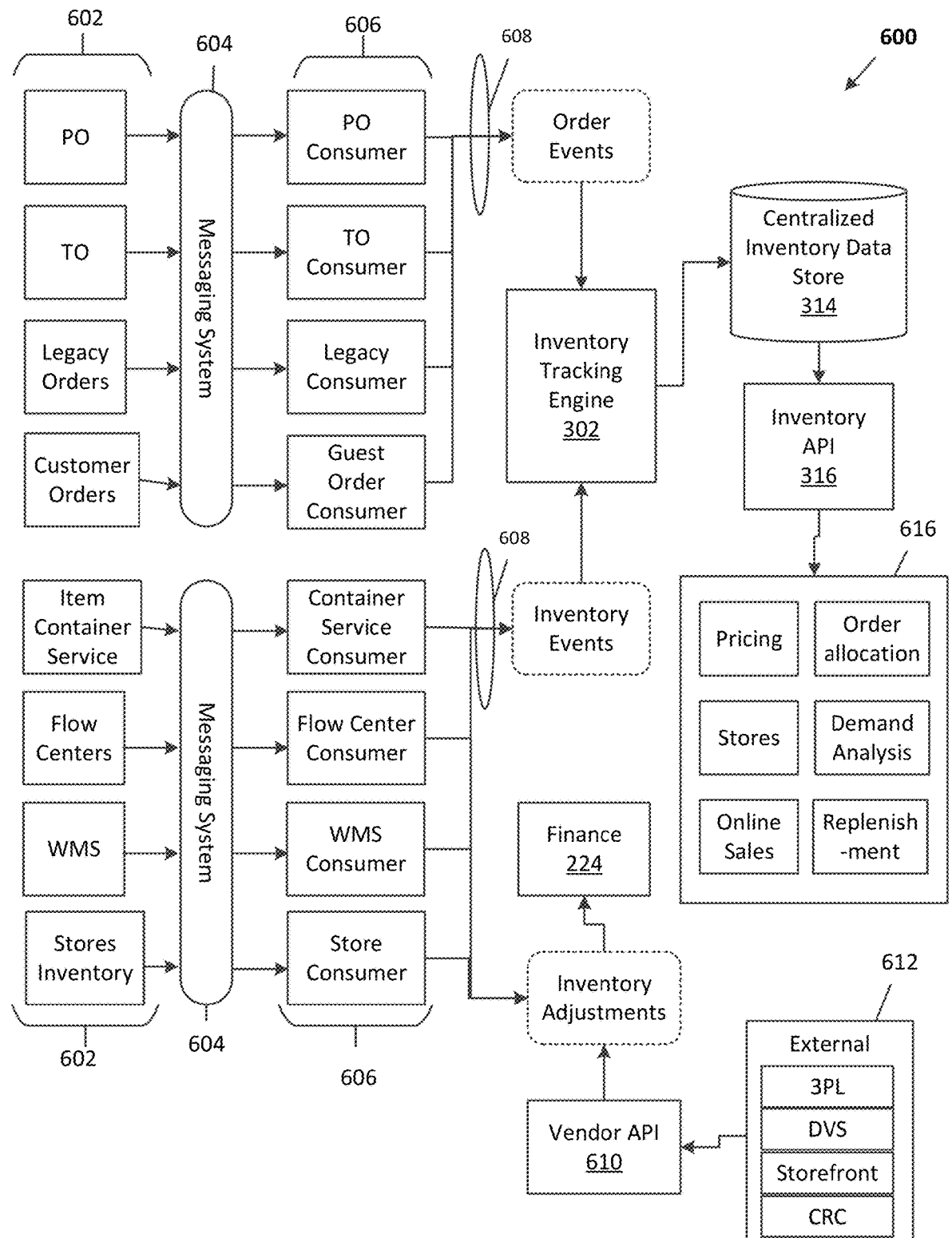
FIG. 6 illustrates an example block diagram of sources of information for the inventory tracking engine of FIG. 3.

FIG. 6 illustrates an example block diagram 600 of sources of information for the inventory tracking engine 302. Information producers 602 communicate messages regarding inventory movements through a messaging system 604 to information consumers 606. Information producers 602 include various computing systems that monitor and manage different aspects of a retail supply chain. Examples can include systems responsible for issuing and managing purchase orders (PO) and/or transfer orders (TO), as well as various warehouse management systems (WMS) which track and manage inventory positioning within a specific warehouse location (e.g., a receive center 104 or flow center 106 as noted above).

In some embodiments, the information producers 602 are location-specific, providing inventory information about a particular node within the supply chain. Systems for legacy orders and customer orders can also provide information about item movements across a supply chain; however, often such systems provide inventory movements at a truck, carton, or other level, rather than on a per-item level; item level inventory movements must then be extrapolated. Other sources of information can include item container services systems, systems for managing flow centers and warehouses, and systems for managing store inventory for purposes of determining item positioning. The messages communicated to the messaging system 604 could be for anticipated item movements (e.g. when a transfer order is issued) or for item movements that have already taken place (e.g. warehouse acknowledges receipt of items).

The messaging system 604 operates to mediate the stream of messages from the information producers 602 to the information consumers 606. In some embodiments, the messages from the producers 602 are organized into topics that are monitored by the consumers 606. Examples of messaging systems include Apache Kafka®, RabbitMQ, Erlang, and ApacheMQ®.

Information consumers 606 read the messages that are communicated through the messaging system 604. The information regarding inventory movements in the form of order events and inventory events are communicated to the inventory tracking engine 302 for processing as discussed in reference to FIG. 3.

In some embodiments, a filtering relay 608 operates to filter messages from the information consumers 606 before the information from the messages is passed on to the inventory tracking engine 302. The filtering relay 608 removes messages containing information that is repeated in other messages. The filtering relay 608 provides the advantage of being able to process messages from at least two different inventory systems and ensure that each order event or inventory event is only tracked once. Filtering the messages before they arrive at the inventory tracking engine reduces the amount of deduplication that the inventory tracking engine 302 has to perform. The inventory tracking engine 302 can therefore operate more efficiently to update inventory level information in the centralized inventory data store 314.

Inventory adjustments are communicated from some consumers 606 to finance systems 224. Additionally, inventory adjustments can be received from a vendor API 610 from external data sources 612. Examples of external data sources include various warehouse or store management computing systems (illustrated as, e.g., 3PL, DVS, Storefront, and CRC) which track inventory levels and positioning at specific nodes within a retail supply chain. Such systems generally manage, store, and display inventory data in different ways, and are not readily integrable or useable for tracking inventory data across an entire organization. While such systems may be able to notify other systems of the existence of inventory movement events, as noted above, the lack of coordination among those systems, as well as with a centralized inventory management system, results in Information in the centralized inventory data store 314 is accessed through an inventory application programming interface (API) 316 by external consumers 616. Examples of external consumers 616 include pricing systems, order allocation systems, store management systems, demand analysis systems, online sales systems, and replenishment systems.

Figure 7:
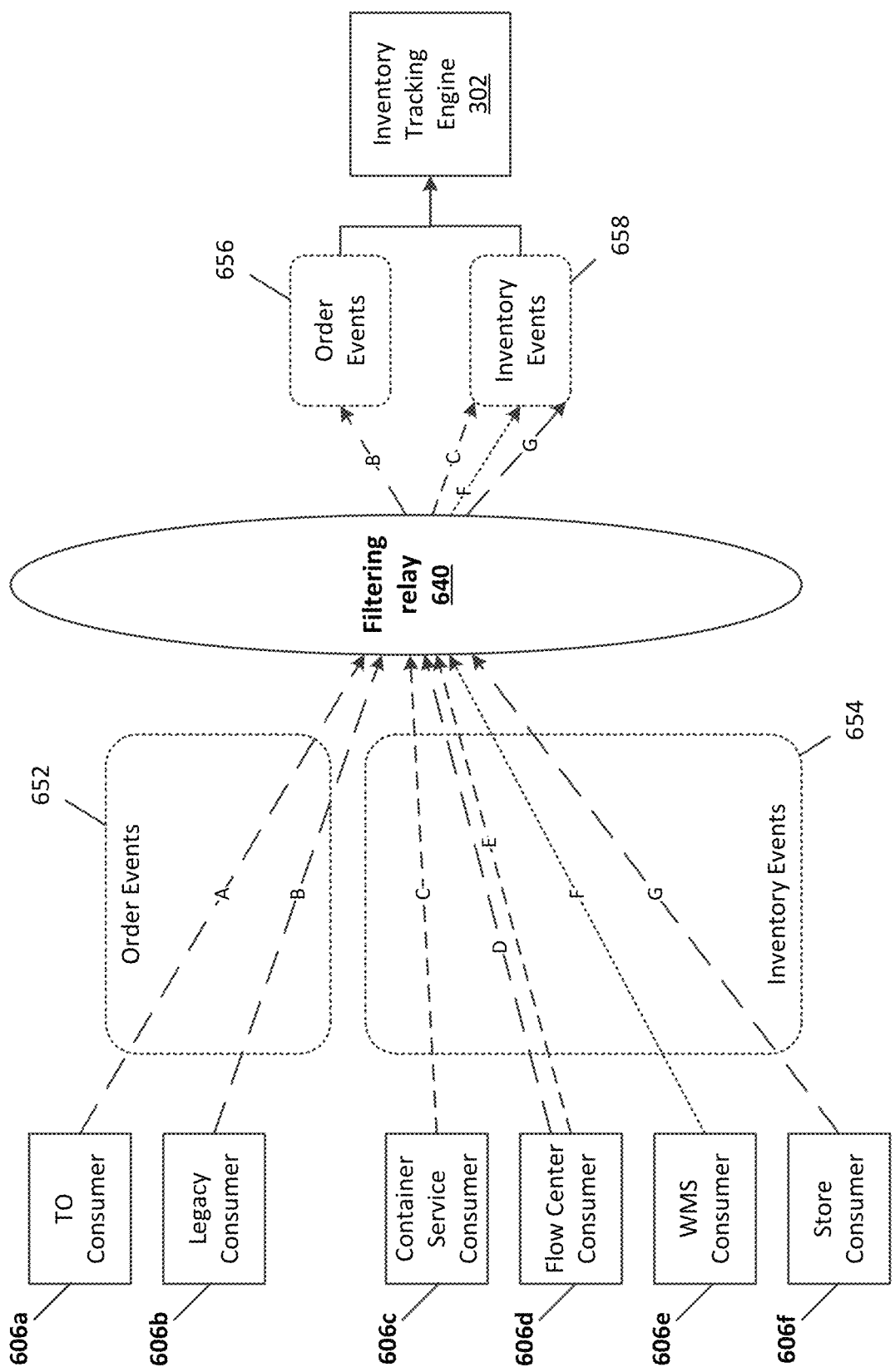
FIG. 7 is a more detailed example block diagram illustrating the operation of the filtering relay of FIG. 6.

FIG. 7 is a detailed schematic diagram illustrating one example of how the filtering relay 608 can operate within a supply chain management system. The filtering relay 608 can be customized to select preferred sources of information when there are multiples of the same information being relayed in messages. There are multiple sources that can provide the same information regarding item movements. The filtering relay 608 applies rules to messages that are received from message consumers 606 to determine which ones to pass on.

In the example of FIG. 7, a variety of different message consumers 606 have received messages that could be passed on to the inventory tracking engine 302. Before the information in these messages can be communicated to the inventory tracking engine 302, the filtering relay 608 deduplicates any redundant messages. In this example, message A from the transfer order consumer 606a, message B from the legacy consumer 606b, message D from the flow center consumer 606d, and message G from the store consumer 606g all involve the same transaction. Messages A and B pertain to order events 652 and messages D and G pertain to inventory events 654. At the filtering relay 608, duplicate messages are removed. Here, message A is eliminated because message B has the same order event information. Message B is forwarded on to the order events 656. Similarly, message D is eliminated because message G has the same inventory event information. Message G is forwarded on to the inventory events 658.

Some messages do not have repeats, so no action is required from the filtering relay. For example, message F from the WMS consumer 606e is the only inventory event information about that event, so message F is forwarded on to the inventory events 658 that are communicated to the inventory tracking engine 302.

Figure 8:
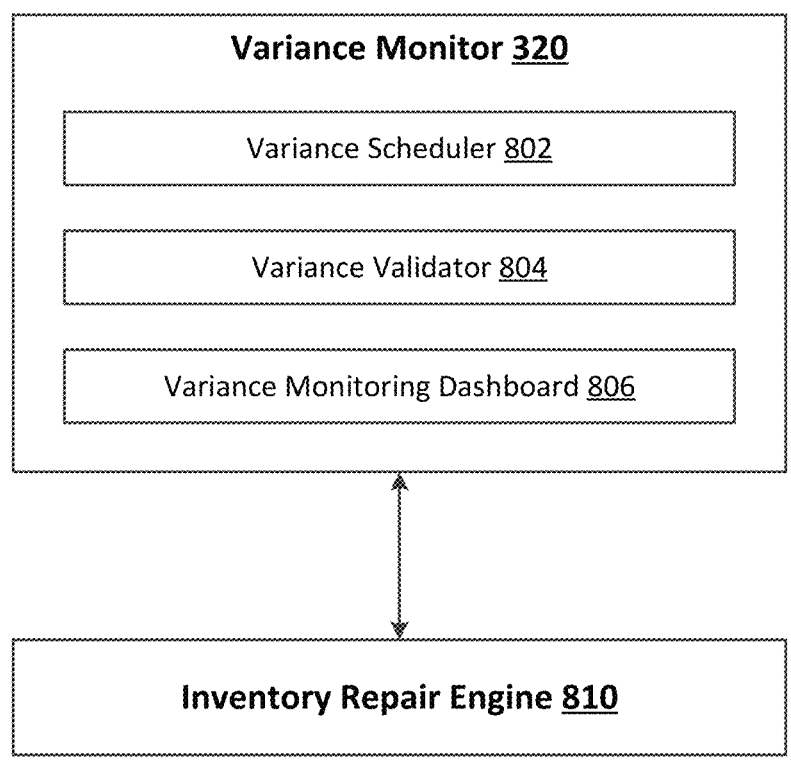
FIG. 8 is a block diagram illustrating an interface between the variance monitor and an inventory repair engine, according to an example embodiment.

FIG. 8 shows a more detailed schematic of the variance monitor 320 and an inventory repair engine 810. As mentioned above, the variance monitor 320 operates to perform periodic checks of recorded inventory levels both at inventory movement information sources 313 and a centralized inventory data store 314. The variance monitor 320 includes a variance scheduler 802, a variance validator 804, and a variance monitoring dashboard 806.

The variance scheduler 802 operates to regulate how often checks of inventory information are performed. In some embodiments, checks are performed at different intervals for different types of items. For example, high priority items may be checked more frequently than average items. Multiple variance schedules are possible. The variance scheduler 802 communicates with the variance validator 804 to initiate checks of inventory levels at both the centralized inventory data store 314 and the inventory movement information sources 313.

In some embodiments, a random item is checked every 5 minutes. This could apply to items generally—items that are "normal" or "average." Other time intervals could be used such as every 1 minute, every 2 minutes, every 3 minutes, every 4 minutes, or every 6 minutes. These scheduled checks are intended to make sure that there were not any updates from the inventory movement information sources 313 that were not recorded in the centralized inventory data store 314.

High priority items might include a much smaller list of items that are checked frequently, such as once an hour, to ensure that inventory levels are accurate. Other examples of time intervals could include every 30 minutes, every 45 minutes, every 75 minutes, every 90 minutes, and every two hours. High priority items might be items that a business has considered to be high visibility or important to the business at that time. The list of items could change with seasonality or promotions. The list of items could also include a particular set of items that are important to the business at all times.

The variance scheduler 802 also monitors how often an item quantity is updated. If an item quantity has not been updated in a particular time period, the variance scheduler 802 will initiate a variance check of that item. For example, if the item has not been updated in the last 30 days, the variance scheduler 802 will ensure that data for that item is not stale. Other time periods for this check could be two weeks, three weeks, four weeks, five weeks, six weeks, 60 days, and 90 days.

The variance validator 804 operates to execute variance checks. Instructions from the variance scheduler 802 are received indicating which item records to check. The variance validator 804 checks the inventory levels recorded in the appropriate inventory movement information source 313 and the centralized inventory data store 314 to ensure that the records are in sync. In the event that an item record is inconsistent, the variance validator 804 communicates a command to the inventory repair engine 810 to proactively correct the discrepancy.

The variance validator 804 also collects and publishes metrics on how many items were checked and how many items differed. This information is communicated to the variance monitoring dashboard 806 as a variance percentage (%). The variance percentage is calculated for each inventory movement information source 313 and the overall system as a whole as compared to the centralized inventory data store 314. The number of items/locations that did not match is divided by the total number of item records checked to provide a number for the proportion of checked inventory levels that varied from one system to another.

The variance monitoring dashboard 806 operates to display information on a graphical user interface (GUI). In particular, a display of the variance percentage for the various inventory movement information sources 313 can be viewed as well as an overall variance percentage. The user interface can be configured to display different subsets of variance information. Alerts can be configured to notify a user when variances exceed a given threshold. Examples of a graphical user interface 1000 usable to view the variance monitoring dashboard 806 are described in FIGS. 10 and 11.

The inventory repair engine 810 operates to correct discrepancies in inventory level data that are identified by the variance monitor 320. A repair event is generated to proactively correct inventory data in the centralized inventory data store 314 or the appropriate inventory movement information source 313. The repair event may involve, for example, generating an alert to update inventory level data in the centralized inventory data store 314, or simply updating the inventory level data directly while notifying one or more users of the variance so a root cause of that variance may be investigated.

Figure 9:
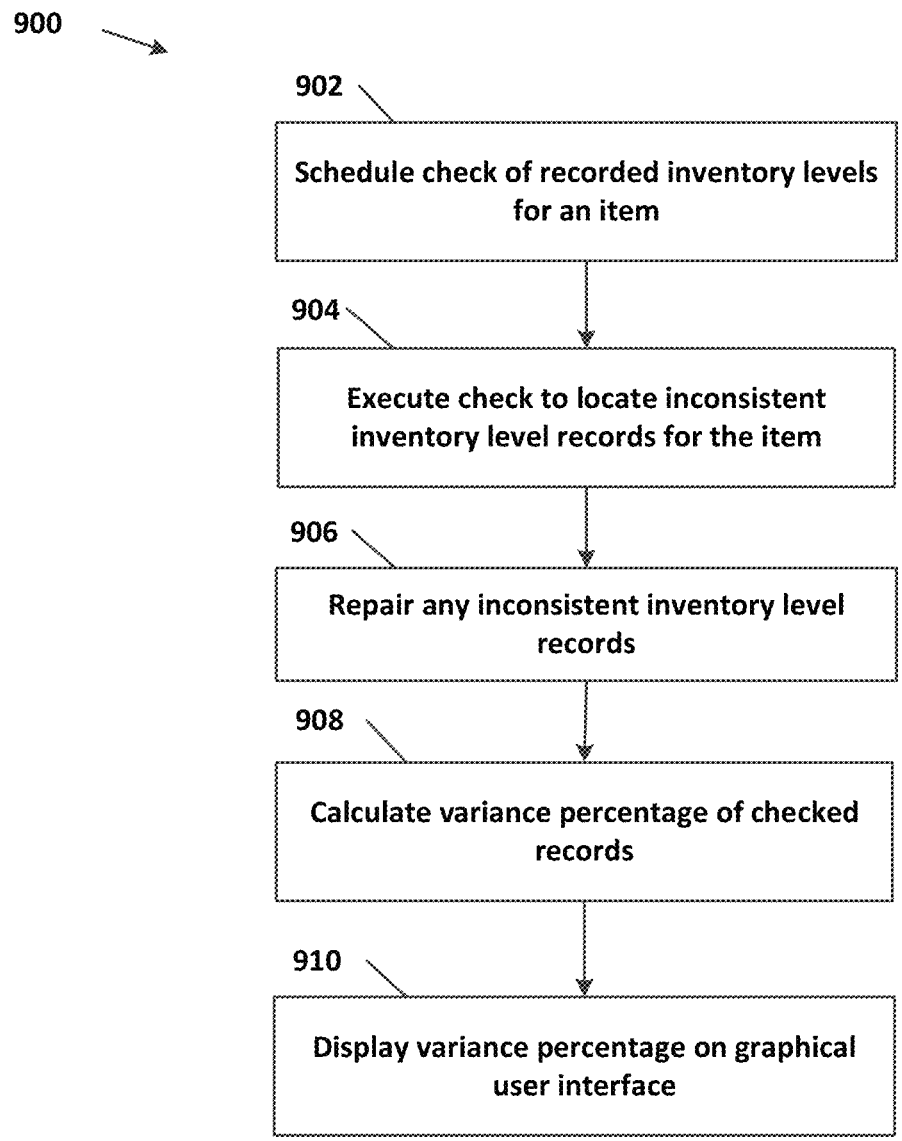
FIG. 9 illustrates a flow diagram of a method of monitoring variance in a supply chain management system, according to an example embodiment.

FIG. 9 is a flow diagram of an example method 900 of monitoring variance in a supply chain management system. In some embodiments, the method 900 is performed by one or more components of the inventory management system 202 of FIG. 3. For purposes of simplicity and clarity, the method 900 is described for monitoring a single item. However, the method would typically operate to monitor variance of multiple items in a supply chain. As mentioned above, different items may be checked at different intervals, with more important items being checked more frequently. In some embodiments, the item being checked is selected at random.

At operation 902, a check of recorded inventory levels for an item is scheduled. In some embodiments, the variance scheduler 802 of FIG. 8 performs this operation 902. It is determined how often the item inventory levels should be checked. For example, for an average item, the inventory levels might be checked only periodically. In some embodiments, the item is scheduled to be checked as part of a random selection of all items within a supply chain. In some embodiments, the item is scheduled to be checked because no movement activity has been recorded for that item in a given period of time.

When it is time for the scheduled check, the method 900 proceeds to operation 904, where the check is executed. In some embodiments, this operation 904 is performed by the variance validator 804 of FIG. 8. Inventory level information at a centralized inventory data store 314 is compared to inventory level information at one or more inventory movement information sources 313. In the event that any inconsistencies are found, the variance validator 804 communicates the inconsistency to the variance monitoring dashboard 806 and inventory repair engine 810.

At operation 906, any inconsistent inventory level records are repaired. In some embodiments, this involves changing the information recorded in the inventory movement information sources 313. In other instances, the information recorded in the centralized inventory data store 314 is corrected.

At operation 908, a variance percentage of checked inventory level records is calculated. In this simplified example of checking a single item, the variance would be either 100% or 0% for any given inventory movement information source 313 or the centralized inventory data store 314, when taken individually. However, when multiple items are checked at a given time, the variance percentage provide an indication of how often the various systems within a supply chain management system are inconsistent. The lower the variance percentage, the better the systems are in sync with one another.

At operation 910, the variance percentage is displayed on a graphical user interface (GUI). One example of such a GUI is provided in FIGS. 10 and 11. In some embodiments, this operation 910 is performed by the variance monitoring dashboard 806 of FIG. 8.

Figure 10:
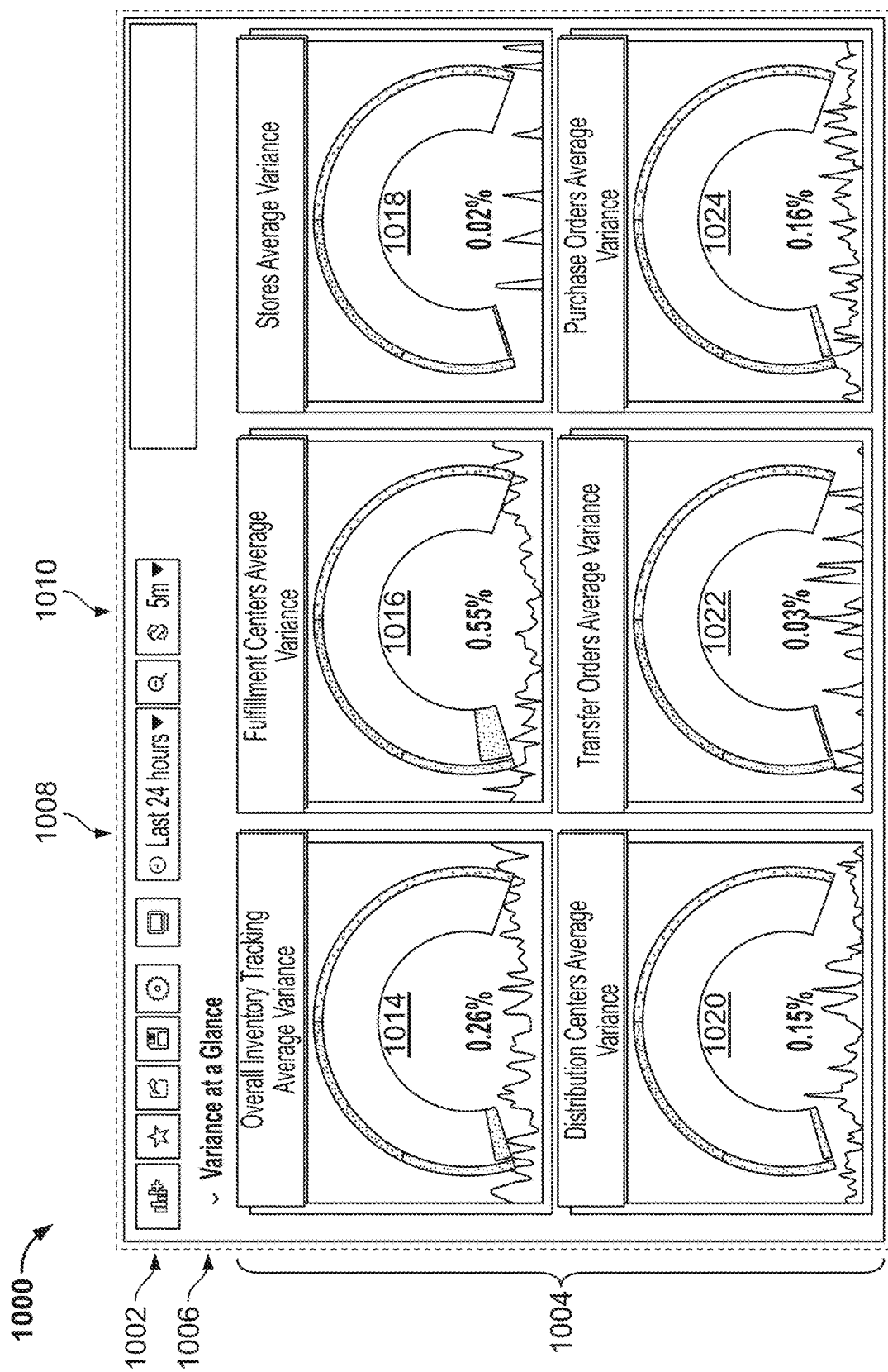
FIG. 10 illustrates an example user interface for viewing inventory variance information, according to an example embodiment.

FIG. 10 illustrates an example GUI 1000 for viewing inventory variance information. The GUI 1000 may be presented, for example to a user within an enterprise for monitoring enterprise-wide or store-specific variance information regarding a particular item, across all items, at particular nodes (locations) or node types (e.g., stores, or distribution centers) within a supply chain, or types of inventory updates resulting in such variance (e.g., purchase orders or transfer orders). The GUI 1000 includes a menu bar 1002 and a dashboard area 1004. The menu bar 1002 includes multiple options for adjusting settings of the GUI 1000. The dashboard area 1004 displays graphical representations of variance data according to the selected settings.

In the example of FIG. 10, the menu bar 1002 includes a pull-down menu 1006 that has selected "Variance at a Glance." Other options for viewing variance information could be selected from the pull-down menu 1006. The timeframe selector 1008 allows a user to specify the timeframe for variance that is displayed in the dashboard area 1004. In this example, "Last 24 hours" is selected. The variance percentage for all inventory records checked in the last day are displayed. The refresh rate selector 1010 allows a user to specify how often the dashboard area 1004 is updated with new variance information. In this example, "5 m" is selected, indicating that the display is refreshed every five minutes. In some embodiments, the dashboard area 1004 may be refreshed as often as new information is received. In other embodiments, the dashboard area 1004 is only refreshed upon receiving a commend at the GUI 1000.

The dashboard area 1004 of FIG. 10 shows graphical representations of variance data for the last 24 hours. Different graphics are shown to represent variance for "Overall Inventory Tracking Average Variance" 1014, "Fulfillment Centers Average Variance." 1016, "Stores Average Variance" 1018, "Distribution Centers Average Variance" 1020, "Transfer Order Average Variance" 1022, and "Purchase Orders Average Variance" 1024. Each graphic shows a dial representing the average variance for the specified inventory movement information source 313 (or sources). A small line graph below the dial indicates how the variance changed over the 24 hour time period. Other visualizations of variance data are possible such as bar graphs, pie charts, etc.

Figure 11:
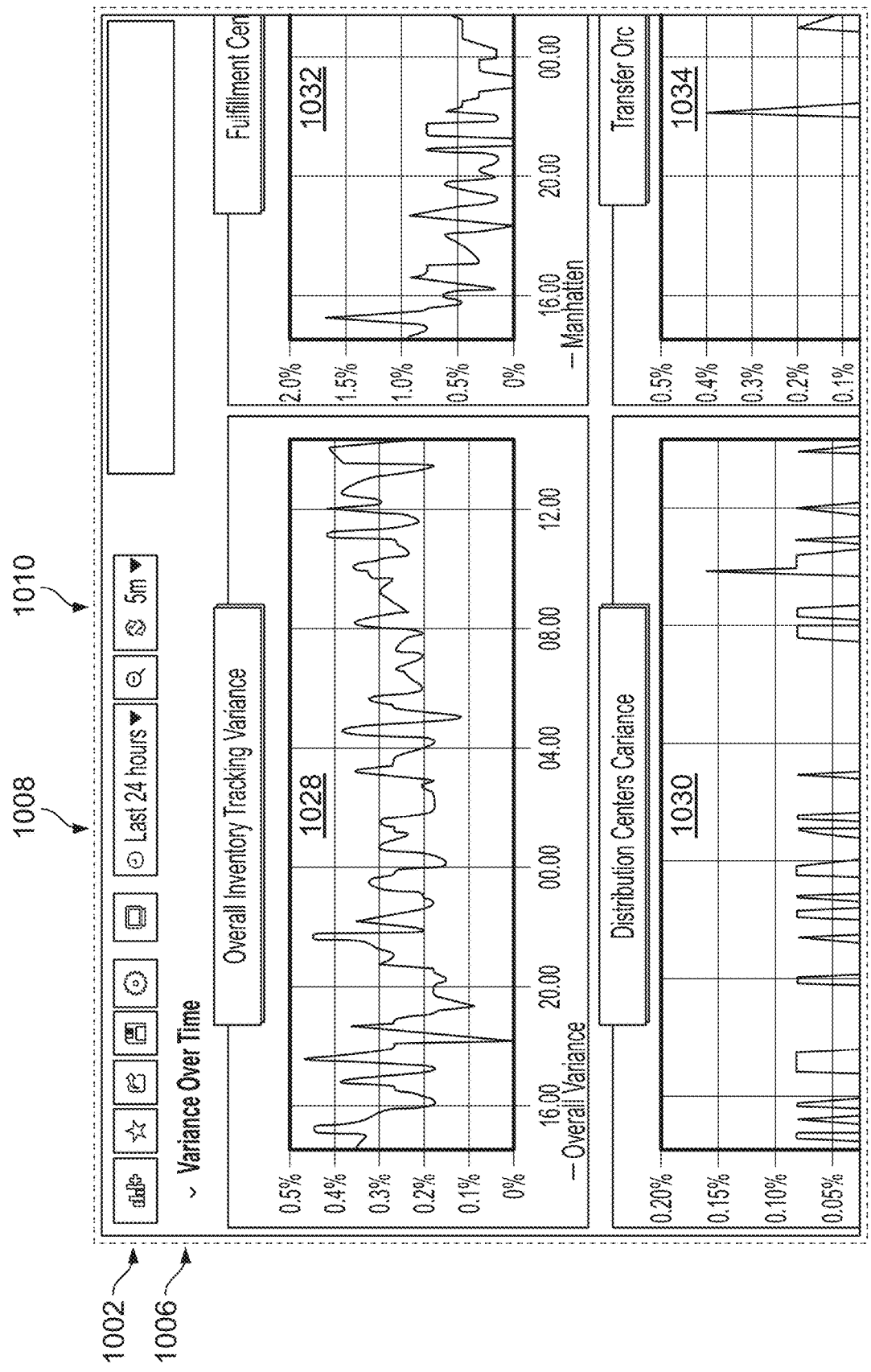
FIG. 11 illustrates an example user interface for viewing inventory variance information, according to a further example embodiment.

FIG. 11 illustrates another view of the example GUI 1000 for viewing inventory variance information of FIG. 10. In this example, the pull-down menu has been changed to select "Variance Over Time." The timeframe selector 1008 is still set to "Last 24 hours" in this example; however, this is adjustable by the user to view a variance graph over user-selectable time periods. The dashboard area 1004 displays multiple graphs representing percent variance over the course of (in this case) 24 hours. Different line graphs are displayed for "Overall Inventory Tracking Variance" 1028, "Distribution Centers Variance" 1030, "Fulfillment Center Variance" 1032, and "Transfer Order Variance" 1034. The graphs plot percent variance on the y-axis against time on the x-axis.

Accordingly, using the methods, systems, and user interfaces of FIGS. 8-11, a user may quickly be able to determine accuracy of an enterprise-wide set of inventory information that is updated using inventory level information received as part of each inventory update transaction, thereby providing a mechanism for continual improvement of centralized inventory tracking through reductions in variance between the centralized inventory data store and other, unaffiliated individual store and/or warehouse inventory management systems used within an enterprise.

Using FIG. 1 as a reference, the following is one example of how the inventory tracking engine 302 and centralized inventory data store 314 could be utilized to manage different aspects of a retail supply chain.

The replenishment management system 204 determines that 5 units of cereal need to be moved from a first flow center 106a to a second flow center 106b. A transfer order is issued by the transfer order generator 306 and is received by the transportation management system 206. The transfer order information is forwarded to the inventory tracking engine 302.

A first computing system for handling transfer orders communicates a message through the messaging system 604 that is eventually received by the inventory tracking engine 302. A second computing system for monitoring flow centers communicates messages through the messaging system 604 indicating that 5 units of cereal left the first flow center 106a and arrived at the second flow center 106b. The first computing system and second computing system operate using different formats of messages.

The inventory tracking engine 302 receives these messages and analyzes them to determine the current disposition of the items in transit. In this example, the messages might indicate that the 5 units of cereal are currently being processed or are pending available at the second flow center 106b. The second computing system further communicates the current inventory levels of cereal to the inventory tracking engine 302 for both the first flow center 106a and second flow center 106b.

The inventory tracking engine 302 determines that the messages received from the first computing system and the second computing system are duplicates of the same movement and eliminates the duplicated information. In some embodiments, this could be performed by the filtering relay 608 of FIG. 6. The current inventory levels of the flow centers can be used to confirm the correct item count at each location. Additionally, the confirmed inventory updates are saved to the centralized inventory data store 314.

A retail store could access the centralized inventory data store 314 through the inventory API 316. For example, the retail store 108d of FIG. 1 could use the information to determine how much cereal to keep in stock. If the retail store 108d can rely on stock available at the second flow center 106d, it might be able to keep a leaner supply of cereal on hand at the retail store 108d. The movement of cereal from the first flow center 106a (which does not easily supply the retail store 108d) to the second flow center 106b (which does easily supply the retail store 108d), improves the flexibility that the retail store 108d has in keeping supply of cereal because it can rely on extra stock at the second flow center 106d when the retail store 108d needs to quickly replenish its stock of cereal.

In addition to the above, any discrepancies between the current inventory levels and the expected inventory levels based on data stored at the centralized inventory data store 314 may generate a discrepancy detectable by the variance monitor 320 at a predetermined interval. An inventory repair engine 810 may update the inventory levels reflected in the centralized inventory data store 314, while the identified discrepancy may be tracked as a variance between central and localized inventory systems. A variance monitoring dashboard may be presented to an enterprise user to perform follow-up investigation regarding the reason for such a variance.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for tracking inventory across a supply chain including a plurality of retail locations and a plurality of distribution locations, the system comprising:
   a centralized inventory data store;
   a computing system in communication with the centralized inventory data store, the computing system including a processor, and a memory communicatively coupled to the processor, the memory storing instructions executable by the processor to execute an inventory tracking engine which, when executed, causes the computing system to:
      receive an inventory movement message regarding movement of an item from an origin location to a destination location;
      extract inventory information via a first filtering relay from the inventory movement message, the inventory information comprising an item identifier for the item, a quantity of the item, an origin location identifier, and a destination location identifier;
      receive inventory level information for the item via a second filtering relay from an origin location inventory database corresponding to the origin location identifier and from a destination location inventory database corresponding to the destination location identifier;
      normalize the received inventory level information from the inventory movement message and the origin location inventory database to a common format at the first filtering relay and the second filtering relay, respectively; and record updated inventory level information for the origin location and destination location in the centralized inventory data store based upon the normalized received inventory level information from the inventory movement message and the origin location inventory database.

2. The system of claim 1, wherein the origin location inventory database operates within a first software system tracking inventory in a first format and the destination location inventory database operates within a second software system tracking inventory in a second format.

3. The system of claim 2, wherein the computing system further operates to normalize the inventory level information into a single format before recording in the centralized inventory data store.

4. The system of claim 1, wherein inventory movements include transfer orders, purchase orders, sales, and combinations thereof.

5. The system of claim 1, further comprising an application programming interface providing access to the inventory level information in the centralized inventory data store.

6. The system of claim 1, wherein the inventory movement message is communicated using a streaming data messaging queue.

7. The system of claim 1, wherein the inventory movement message provides information about dispositions of the items.

8. The system of claim 5, wherein one or more consumers of inventory level information provided through the application programming interface comprise retail stores.

9. The system of claim 1, wherein the computing system is communicatively connected to a second computing system hosting a replenishment management system.

10. The system of claim 9, wherein the replenishment management system automatically replenishes inventory on a real-time per-item basis.

11. The system of claim 1, wherein the computing system further operates to:
periodically check inventory level information for one or more items at the centralized inventory data store and at one or more sources of inventory movement messages;
repair inconsistent inventory level information; and
report a variance percentage of a number of items having inconsistent inventory level information compared to the total items checked.

12. A non-transitory computer-readable storage medium comprising computer-executable instructions which, when executed by a computing system, cause the computing system to perform a method of managing item attribute data, the method comprising:
receiving, at an inventory tracking computing system, a plurality of inventory movement messages regarding real-time movements of individual items from an origin location within a retail supply chain and a destination location within the retail supply chain, the retail supply chain comprising one or more distribution locations and one or more retail store locations;
extracting inventory information via a first filtering relay from the inventory movement messages, the inventory information comprising item identifiers, quantities of items, origin location identifiers, destination location identifiers, and a disposition of the items;
normalizing and deduplicating the inventory information to determine updated inventory levels for the items at the origin locations and destination locations;
receiving location inventory information for the items via a second filtering relay from the origin location inventory databases and destination location inventory databases;
reconciling the updated inventory levels with the location inventory information;
normalizing the received inventory level information from the inventory movement message and the origin location inventory database to a common format at the first filtering relay and the second filtering relay, respectively;
recording the reconciled updated inventory levels for the origin location and destination location and the dispositions of the items at a centralized inventory data store;
communicating the reconciled updated inventory levels to a replenishment management system operating in conjunction with an inventory management system based upon the normalized received inventory level information from the inventory movement message and the origin location inventory database; and
automatically generating, at the inventory management system, one or more purchase orders and transfers orders to adjust inventory levels at one or more distribution locations and retail store locations within the retail supply chain in response to the reconciled updated inventory levels.

13. The system of claim 1, wherein the computing system is further configured to:
schedule periodic checks of inventory levels for one or more items;
execute checks of inventory levels at one or more inventory event message sources and the centralized inventory data store;
repair inventory level data for items that are inconsistent; and
report the proportion of checked inventory levels having inconsistencies as a variance percentage.

14. The system of claim 13, further comprising a graphical user interface, wherein the system is configured to display the variance percentages on the graphical user interface, the graphical user interface comprising:
a dashboard area configured to display graphical representations of variance percentage data; and
a menu bar having a plurality of selectors for adjusting display settings of the dashboard area.

15. The system of claim 10, wherein the replenishment management system is configured to use updated inventory level in conjunction with an inventory management system to automatically generate purchase orders and transfers orders to adjust inventory levels at one or more locations within a supply chain, the one or more locations comprising retail stores.

16. The system of claim 15, wherein the replenishment management system and the inventory management system are further configured to reconcile the inventory movement message with the inventory level update to confirm the updated inventory level.

17. The system of claim 16, wherein the centralized inventory database is configured to analyze a plurality of messages in real-time and reconcile inventory levels in near-realtime for the supply chain.

18. The system of claim 17, wherein the plurality of messages are received from one or more of a purchase order system, a transfer order system, a warehouse management system, an inventory management system, and a store management system.

\* \* \* \* \*